Patented July 17, 1923.

1,462,460

UNITED STATES PATENT OFFICE.

STANLEY APGAR, OF HIGH BRIDGE, NEW JERSEY, ASSIGNOR TO TAYLOR-WHARTON IRON AND STEEL COMPANY, OF HIGH BRIDGE, NEW JERSEY, A CORPORATION OF NEW JERSEY.

HEAT TREATMENT OF LIGHT CASTINGS.

No Drawing.    Application filed June 5, 1922. Serial No. 566,160.

*To all whom it may concern:*

Be it known that I, STANLEY APGAR, a citizen of the United States, residing at High Bridge, in the county of Hunterdon and State of New Jersey, have invented certain new and useful Improvements in Heat Treatments of Light Castings, of which the following is a specification.

The object of my invention is to provide a method of heat treating manganese steel chain and other light castings whereby decarburization and oxidation are substantially avoided and the strength of the article undergoing heat treatment actually increased as much as fifty per cent.

In the ordinary practice of heat treating manganese steel chain and other light castings, they are charged in large quantities in a cold furnace which is then heated to the usual temperature for the treatment of manganese steel. This operation requires several hours in consequence of which the skin of the castings is decarburized and oxidized by the oxidizing gases of the furnace. This leaves the metal of the skin relatively weak, and in light castings the proportion of good metal remaining is seriously reduced.

According to my invention the articles to be treated are introduced in a cold state into an environment such that they are substantially protected from decarburization and oxidation, and this protection is maintained by rapidly heating the articles to the ultimate toughening temperature and then proceeding in the usual way.

I have demonstrated in actual practice that I can obviate or materially reduce decarburization and oxidation, and hence improve the strength and wearing qualities of manganese steel chain and other light castings by charging them cold into a furnace heated to a temperature of at least 800° C., and then heating rapidly to the usual temperature for the heat treatment of manganese steel, and quenching. The average interval of treatment is about thirty minutes to a charge. The new treatment is not only beneficial in improving the wearing properties of the articles undergoing treatment, but actually increases their strength. For example, the lighter patterns of chain show an increased strength of as much as fifty per cent.

Having described my invention, I claim:—

1. The herein described method of heat treating manganese steel chain and other light castings, which consists in heating them in an environment in which they are substantially protected from decarburization and oxidation, and then proceeding in the usual way.

2. The herein described method of heat treating chain and other light castings of manganese steel, which consists in charging the articles cold into a furnace heated to a temperature of at least 800° C., and then proceeding in the usual way.

3. The herein described method of heat treating chain and other light castings of manganese steel, which consists in charging the articles cold into a furnace heated to a temperature of approximately 800° C., and rapidly raising the temperature to complete the treatment so that the average time interval of treatment is about thirty minutes to the charge.

4. The herein described method of heat treating chain and other light castings of manganese steel which consists in introducing the same in a cold state into an environment in which they are substantially protected from decarburization and oxidation, rapidly heating to the ultimate toughening temperature, and quenching.

In testimony whereof I affix my signature.

STANLEY APGAR.